US012608234B2

(12) United States Patent
Royal et al.

(10) Patent No.: US 12,608,234 B2
(45) Date of Patent: Apr. 21, 2026

(54) WORKLOAD ANALYZER FOR MONITORING AND OPTIMIZING WORKLOAD PERFORMANCE

(71) Applicant: Oracle International Corporation, Redwood Shores, CA (US)

(72) Inventors: Gaylen Royal, Pittsboro, NC (US); Karen Michaels, Hollis, NH (US); Björn Bolltoft, Kungsbacka (SE)

(73) Assignee: Oracle International Corporation, Redwood Shores, CA (US)

( * ) Notice: Subject to any disclaimer, the term of this patent is extended or adjusted under 35 U.S.C. 154(b) by 425 days.

(21) Appl. No.: 18/316,069

(22) Filed: May 11, 2023

(65) Prior Publication Data

US 2024/0126607 A1 Apr. 18, 2024

Related U.S. Application Data

(60) Provisional application No. 63/416,575, filed on Oct. 16, 2022.

(51) Int. Cl.
| | |
|---|---|
| *G06F 9/50* | (2006.01) |
| *G06F 11/30* | (2006.01) |
| *G06F 11/34* | (2006.01) |
| G06F 16/245 | (2019.01) |

(52) U.S. Cl.
CPC ........ *G06F 9/5038* (2013.01); *G06F 11/3075* (2013.01); *G06F 11/3433* (2013.01); *G06F 16/245* (2019.01)

(58) Field of Classification Search
CPC .............. G06F 9/5038; G06F 11/3075; G06F 11/3433; G06F 16/245; G06F 16/217
See application file for complete search history.

(56) References Cited

U.S. PATENT DOCUMENTS

| | | | | |
|---|---|---|---|---|
| 9,189,522 | B2 * | 11/2015 | Das ................... | G06F 16/24542 |
| 10,148,483 | B1 * | 12/2018 | Lippitt ................. | G06F 3/0632 |
| 10,705,877 | B2 * | 7/2020 | Wolfson ............... | G06F 9/5038 |
| 11,314,740 | B1 * | 4/2022 | Hwang ............... | G06F 11/3419 |
| 11,386,059 | B2 * | 7/2022 | Lee ..................... | G06F 11/3688 |
| 11,609,910 | B1 * | 3/2023 | Papakonstantinou ........................ G06F 16/24539 |
| 11,734,116 | B1 * | 8/2023 | Bunescu ............. | G06F 11/3414 714/38.1 |
| 2009/0106321 | A1 * | 4/2009 | Das ................... | G06F 16/24542 |

(Continued)

*Primary Examiner* — Benjamin C Wu

(74) *Attorney, Agent, or Firm* — Invoke

(57) ABSTRACT

Techniques are described herein for analyzing and tuning database workloads to optimize application performance. In some embodiments, a workload analyzer identifies a captured workload that includes a set of database queries executed within a particular timeframe. The workload analyzer compares the workload within one or more other workloads executed within a previous timeframe to determine differences between the different workloads. For example, the workload analyzer may identify changes in the distributions of queries, including how many queries are unchanged, missing, and/or new. The workload analyzer may further detect changes in the performance of individual queries. The workload analyzer may determine the overall performance impact of such changes on the total workload. Based on the analysis, the workload analyzer may generate reports, alerts, tuning advice, and/or recommendations to boost performance.

20 Claims, 9 Drawing Sheets

(56)  References Cited

U.S. PATENT DOCUMENTS

| | | | | |
|---|---|---|---|---|
| 2009/0313631 A1* | 12/2009 | De Marzo | ............. | G06F 9/5038 |
| | | | | 718/103 |
| 2010/0198807 A1* | 8/2010 | Kuno | ............... | G06F 16/24542 |
| | | | | 707/E17.017 |
| 2011/0161310 A1* | 6/2011 | Tang | ................ | G06F 16/24542 |
| | | | | 707/718 |
| 2013/0332430 A1* | 12/2013 | Margalit | ............... | G06F 11/302 |
| | | | | 707/E17.005 |
| 2015/0229582 A1* | 8/2015 | Zhu | ....................... | G06F 9/5011 |
| | | | | 709/224 |
| 2016/0004621 A1* | 1/2016 | Gongloor | ........... | G06F 11/3452 |
| | | | | 707/688 |
| 2018/0060395 A1* | 3/2018 | Pathak | .................. | G06F 16/248 |
| 2019/0095470 A1* | 3/2019 | Dundjerski | ......... | G06F 11/0793 |
| 2019/0354622 A1* | 11/2019 | Sheldon | .............. | G06F 16/2455 |
| 2020/0379963 A1* | 12/2020 | Lopes | .............. | G06F 16/24542 |
| 2021/0263932 A1* | 8/2021 | Shaffer | ............ | G06F 16/24542 |
| 2023/0229659 A1* | 7/2023 | Beresniewicz | ..... | G06F 11/3409 |
| | | | | 707/718 |
| 2024/0126607 A1* | 4/2024 | Royal | .................. | G06F 16/217 |
| 2024/0289481 A1* | 8/2024 | Lance | ................ | G06F 21/6227 |
| 2024/0394251 A1* | 11/2024 | Brende | ............ | G06F 16/24522 |
| 2024/0411535 A1* | 12/2024 | Ken-Kwofie | ............. | G06F 8/51 |
| 2025/0094422 A1* | 3/2025 | Bhaskaran | ........ | G06F 16/24542 |
| 2025/0124041 A1* | 4/2025 | Bandarchuk | ........ | G06F 16/2477 |

* cited by examiner

WORKLOAD ANALYZER FOR MONITORING AND OPTIMIZING WORKLOAD PERFORMANCE

INCORPORATION BY REFERENCE; DISCLAIMER

The following application is hereby incorporated by reference: application No. 63/416,575, filed Oct. 16, 2022. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to analyzing captured database workloads to monitor for fluctuations in performance and efficiently address performance degradation.

BACKGROUND

Database tuning encompasses tools and applications directed to optimizing the performance of a database. Many of these tools are directed to monitoring and improving the performance of database queries. Poorly written or optimized database queries may significantly degrade a database server's performance, increasing the server resources dedicated to processing the query and the server's response times. Problems at the database layer may cascade to the application layer, delaying the execution of application functions that are dependent on receiving database query responses.

To optimize query performance, query monitoring tools often use systemwide performance events to drive the identification of problematic query statements. For example, if the resource utilization on a database server exceeds a predefined threshold, then the monitoring tool may identify the most frequently executed queries and determine whether any optimizations may be applied. This approach may help accelerate the server's performance if the most frequently executed query statements are poorly written or tuned. However, in many cases, these query statements may be within a normal performance range. Other drawbacks of this approach include its failure to account for changes that may occur naturally during the application lifecycle and its tendency to be reactive once problems have already arisen. As a result, the approach may not always be able to isolate and proactively address the primary drivers of performance degradation within the system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
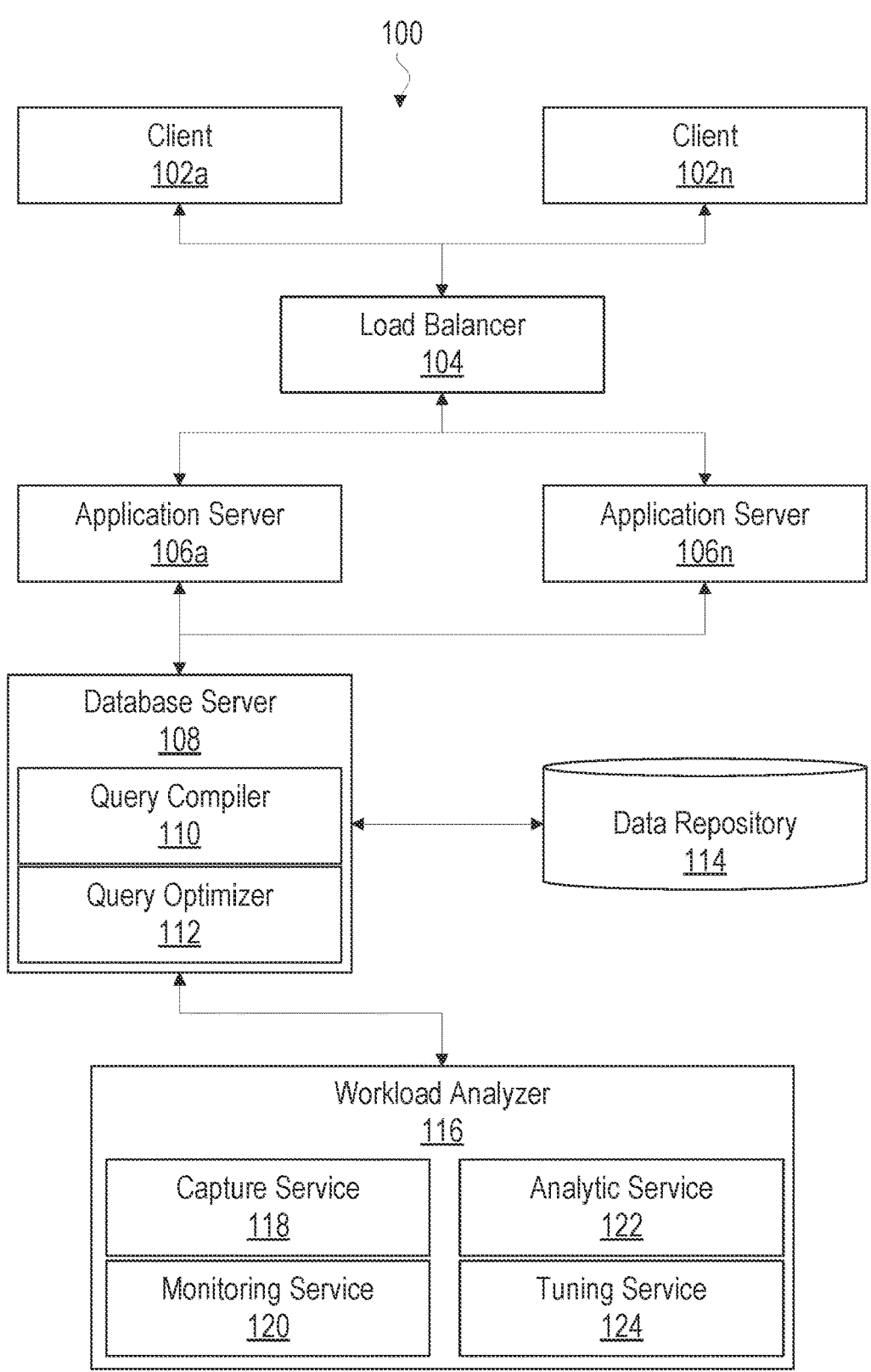
FIG. 1 illustrates an example system architecture that includes a workload analyzer to facilitate database tuning in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention. One or more operations illustrated in the figures and described herein may be modified, rearranged, or omitted all together. Accordingly, the particular sequence of operations illustrated in the figures and examples should not be construed as limiting the scope of one or more embodiments.

1. General Overview

Techniques are described herein for analyzing captured workloads to monitor for fluctuations in performance and efficiently address performance degradation. In some embodiments, a system, referred to herein as a workload analyzer, performs automated collection and analysis of distinct workloads. The data collected and/or otherwise tracked for a given workload may include individual database query statements executed within a particular timeframe, execution statistics/metrics associated with executing the query statements within the particular timeframe, and execution contexts for the query statements. Once a workload or portion thereof is captured, the workload analyzer may compare the collected workload data with data collected from one or more other workloads from previous timeframes. Based on the comparison, the workload analyzer may detect whether performance is regressing or otherwise changing in a statistically significant manner.

If issues negatively impacting performance are detected, then the workload analyzer may generate alerts, reports, and/or tuning advice to address the database query statements that are causing the regression. With continuous workload performance monitoring, the workload analyzer may provide early warnings of performance changes and minimize the time-consuming process of troubleshooting issues reactively after server performance has significantly degraded.

The alerts, reports, and/or advice may identify the performance impacts of various subsets of queries executed within the timeframe including (a) database queries that are new in the target workload and not present in one or more reference workloads, (b) database queries that are unchanged (common) between the target workload and the reference workload(s), and/or (c) database queries that are missing in the target workload and present in the reference workload(s). The alerts, reports and/or advice may be rendered based on which subsets are having the greatest impact on performance changes between the target workload and the one or more reference workloads.

Additionally or alternatively, the workload analyzer may compare performance metrics for an execution of a database query (or queries that satisfy a similarity threshold) between a target workload and/or one or more reference workloads. In continuous monitoring applications, the target workload may capture the most recent query executions within the system and the one or more reference workloads may capture benchmark executions of the query (or queries within a threshold level of similarity) from one or more previous timeframes. Based on the comparison, the workload analyzer may determine whether query performance regressed between the two executions or the current execution and a benchmark computed based on a plurality of previous executions.

If the performance regression exceeds a tolerance threshold, then the workload analyzer may perform additional analytics to determine the cause. For example, the workload analyzer may compare the execution plan for executing the database query in the most recent workload/timeframe with the execution plan for executing the database query in a previous workload/timeframe. If changes to the execution plan are identified, the workload analyzer may add an indication to the report identifying the change's performance impact on the first workload. Additionally or alternatively, the workload analyzer may pin or rollback to a previously accepted execution plan for the regressed query.

One or more embodiments described in this Specification and/or recited in the claims may not be included in this General Overview section.

2. System Architecture

FIG. 1 illustrates an example system architecture that includes a workload analyzer to facilitate database and query tuning in accordance with some embodiments. As illustrated in FIG. 1, system 100 includes clients 102a-n, load balancer 104, application servers 106a-n, database serve 108, data repository 114, and workload analyzer 116. In some embodiments, system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Clients 102a-n represent devices and/or applications for accessing services provided by application servers 106a-n. For example, clients 102a-n may include desktop applications, mobile applications, web browsers, and/or other programs. If remotely located from application servers 106a-n, clients 102a-n may send requests using one or more communication protocols of the Internet Protocol (IP) suite, such as the hypertext transfer protocol (HTTP). In other embodiments, clients 102a-n may be located on the same host machine as application servers 106a-n.

In some embodiments, load balancer 104 intercepts requests from clients 102a-n and routes the requests to application servers 106a-n to distribute the load. For example, load balancer 104 may route requests (a) in a round robin fashion, (b) to the application server processing the fewest number of requests, (c) to the application server with the lowest current resource utilization, or (d) to the application server with the faster response times. Additionally or alternatively requests may be routed based on other factors, such as the geographic locations of the client and application servers.

Application servers 106a-n host and execute applications to serve client requests submitted by clients 102a-n. The applications that are hosted and executed may vary depending on the particular type of service provided to clients 102a-n. During runtime, applications may generate and submit requests to database server 108 to access a database. In some embodiments, the requests include database queries that conform to a particular language and format, such as the Structured Query Language (SQL). SQL statements may include commands for manipulating database data (e.g., inserting, updating, and deleting data within the database), defining database objects (e.g., creating/deleting tables, schemas, and views) and controlling data access (e.g., granting or revoking a user's ability to perform specified tasks in the database).

Database server 108 receives and processes database queries submitted by application servers 106a-n. In some embodiments, database server 108 processes the incoming requests using query compiler 110 and query optimizer 112. Query compiler 110 generates query execution plans for the incoming database queries based on text of the query statement. A query execution plan defines a sequence of operations for generating a query result. For instance, the plan may include logical operators that define relational algebraic functions to process a SQL statement and physical operators that represent objects or routines that implement operations defined by logical operators.

Query optimizer 112 performs operations directed to minimizing the processing overhead associated with executing database queries. In some embodiments, query optimizer 112 analyzes different possible query execution plans for a given database query. Query optimizer 112 may determine an estimated cost for each plan based on predicted and/or observed metrics, such as the number of input/output operations needed to carry out the query execution plan, the amount of disk buffer space, and the central processing unit (CPU) utilization. Query optimizer 112 may select the query execution plan with the lowest estimated cost.

Data repository 114 stores database objects (e.g., tables, views, indexes, schemas, etc.) and data (e.g., binary large objects, character large objects, etc.). In some embodiments, data repository 114 is any type of storage unit and/or device (e.g., a file system, database, collection of tables, or any other storage mechanism) for storing data. Further, data repository 114 may include multiple different storage units and/or devices. The multiple different storage units and/or devices may or may not be of the same type or located at the same physical site. Further, data repository 114 may be implemented or executed on the same computing system as one or more other components of system 100. Alternatively or additionally, data repository 114 may be implemented or executed on a computing system separate from one or more other system components. Data repository 114 may be communicatively coupled to remote components via a direct connection or via a network.

Workload analyzer 116 monitors and analyzes workloads on database server 108. In some embodiments, workload analyzer 116 includes capture service 118 for collecting workload data, monitoring service 120 for tracking performance fluctuations, analytic service 122 to provide insights into the causes of any detected performance fluctuations, and tuning service 124 to provide tuning advice to query optimizer 112 based on the analytic insights. Workload analyzer 116 may execute the operations described further in the sections below to optimize the performance of database server 108. Workload analyzer 116 may execute on the same host as database server 108 or remotely, depending on the particular implementation.

In some embodiments, the components of system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

One or more components of system 100 may be implemented as a cloud service or a microservice application. For example, tenants may subscribe to a cloud service to access services provided by workload analyzer 116, including monitoring workloads and tuning database queries. Additional embodiments and examples relating to computer networks are described below in Section 10, titled *Computer Networks and Cloud Networks*. Additional embodiments and examples relating to computer networks are described below in Section 11, titled *Microservice Applications*.

3. Automated Workload Analysis

In some embodiments, workload analyzer 116 compares database queries executed on database server 108 in two or more different time periods. Based on the comparison, workload analyzer 116 may identify differences between the workloads including new database queries (e.g., SQL statements present in a target workload but not a previous workload), missing database queries (e.g., SQL statements present in a prior workload but not the target workload), and changes in query execution plans (e.g., changes in the sequence and/or operators to process a SQL statement common to both workloads). Workload analyzer 116 may further determine the performance impact for each change on the captured workload, such as the impact on total instruction executions, CPU time, elapsed time, buffer gets, I/0 operations, and/or other performance metrics.

Figure 2:
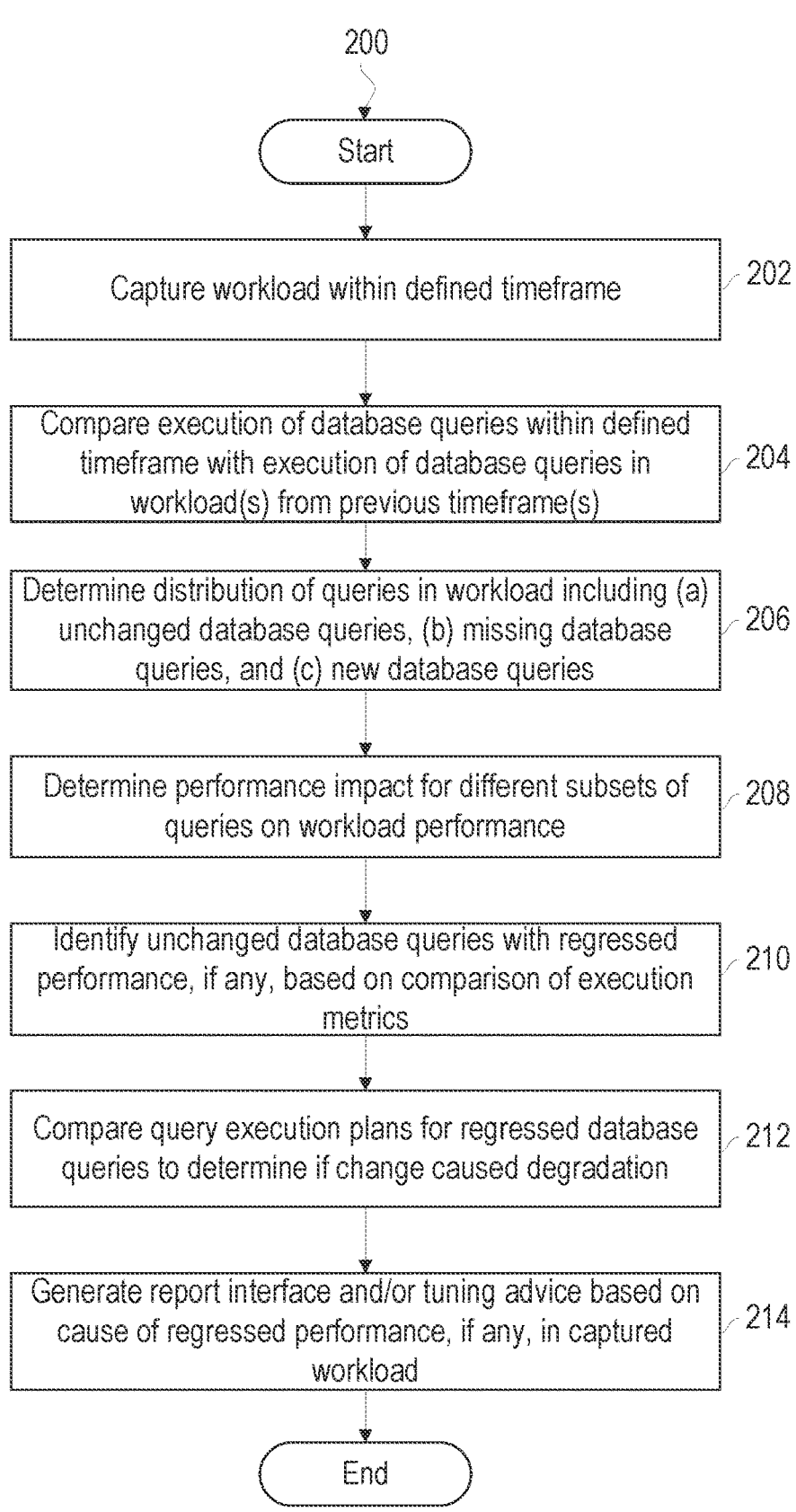
FIG. 2 illustrates an example set of operations for analyzing captured workloads in accordance with some embodiments.

FIG. 2 illustrates an example set of operations for analyzing captured workloads in accordance with some embodiments. One or more operations illustrated in FIG. 2 may be modified, rearranged, or omitted all together. Accordingly, the particular sequence of operations illustrated in FIG. 2 should not be construed as limiting the scope of one or more embodiments.

At operation 202, process 200 captures a workload within a defined timeframe. In some embodiments, process 200 collects database query statements, execution metrics, and execution context from database server 108 within a particular time period. Query statements may include the text of a query, such as SQL commands, function statements, and variable names included therein. Example execution metrics may include:

Response time: The elapsed system time taken by the database system to respond to a query or transaction;

Throughput: The number of queries or transactions that are processed by the database system per unit of time;

Concurrency: The number of transactions a database may handle simultaneously;

CPU utilization: The percentage of CPU time and/or total CPU instructions used by the database system to execute a query or portion thereof;

Memory utilization: The amount of memory used by the database system to execute the query or portion thereof;

Disk I/O: The number of buffer gets, amount of data read from, and/or amount of data written to disk;

Lock contention: The number of times a transaction is stuck waiting for a lock on a database object;

Deadlocks: The number of times two or more transactions are blocked waiting for each other to release locks;

Index usage: The percentage of queries that use an index;

Query optimization: The time taken by the query optimizer to optimize the query for execution.

Additionally or alternatively, other metrics may be captured to measure query execution performance and/or the impact of the execution on the overall system. Metrics may be captured by profilers, monitoring agents (e.g., daemons or other background processes), logs, tracing, and/or sensors.

A query execution context may include information about how or when a database query was executed. For example, the execution context may identify the request that triggered the execution, the host the executed the query, the query execution plan, and/or other information about the runtime environment in which the query was executed. Additionally or alternatively, the execution context may include information about the state of the database server, such as the resources available on the server and concurrent activity on the server. In some embodiments, a query execution context is created responsive to a user or application submitting a query to a database system.

The workload timeframe that is determined at operation 202 may vary depending on the particular implementation. In some embodiments, the timeframe corresponds to a period of time that is set by an end user, such as a database administrator. The user may run collection and analysis on a one-time basis, periodic basis, or continuously. The administrator may further define seasonal timeframes for collection and analysis as described further in the section below.

At operation 204, process 200 compares the execution of database queries within the defined timeframe with execution of database queries in workloads from one or more previous timeframes. In some embodiments, process 200 compares database queries from different timeframes that are expected to have similar workloads. For example, process 200 may compare queries executed within the same period of time on different days of the week if workloads are expected to follow a daily pattern. The timeframes to compare may be specified by a user or inferred through machine learning and/or other analytics.

At operation 206, process 200 determines a distribution of queries in the workload including (a) unchanged database queries, (b) missing database queries that were present in the previous workload, and (c) new database queries that were not present in the previous workload. In some embodiments, process 200 determines the distribution based on a comparison of query identifiers. For example, a SQL ID is a value obtained by applying a hash function to a SQL statement's text. One SQL statement is only associated with a single SQL ID but may be associated with multiple query execution plans. In some cases, the text of a SQL may be normalized using placeholders or bind variables, where different values may be passed to the variable without causing the SQL ID to change. Unchanged database queries may be identified if queries with matching SQL IDs were executed in the different timeframes. SQL IDs for executed queries collected for the previous timeframe with no match in the most recent timeframe may be classified as missing. Conversely, SQL IDs collected for the most recent timeframe with no matches in a previous timeframe may be classified as new.

At operation 208, process 200 determines the performance impact for different subsets of queries on the most recent workload. In some embodiments, process 200 determines the performance impact by aggregating and comparing the collected performance/execution metrics across workloads based on the classified distribution of queries in the most recent workload. For example, process 200 may aggregate and compare execution metrics (e.g., CPU time, buffer gets, etc.) for unchanged/common database queries in the current timeframe and the previous timeframe to determine whether performance has regressed, improved, or stayed the same. Process 200 may further compare aggregated execution metrics for the new queries in the most recent timeframe with aggregated execution metrics for the missing queries in the previous timeframe to determine whether the change in queries degraded or increased performance.

Additionally or alternatively, process 200 may compare the aggregate execution metrics for the different classes of queries relative to the total aggregate execution metrics for database queries in the workload. For example, process 200 may compute the percentage of CPU time consumed by new queries and unchanged queries relative to the total aggregate CPU time. As another example, process 200 may compute the average CPU time per new query compared to the average CPU time per unchanged query. The comparisons allow workload analyzer 116 to determine which class of queries are having a greater impact on fluctuations in workload performance.

Additionally or alternatively, process 200 may compare execution metrics associated with portions of a query. For example, process 200 may identify the most frequently executed SQL statements which may be common across different database queries. Process 200 may compare the performance changes of varying database queries that include the SQL statement across different workloads and infer the impact of the SQL statement based on the comparison. If the execution metrics degrade for database queries that share the same SQL statement relative to other queries that do not include the SQL statement, then process 200 may infer that the particular statement is the root cause of the performance degradation.

Additionally or alternatively, process 200 may compare aggregate performance metrics for queries or query portions that are interrelated. In some embodiments, process 200 may cluster queries and/or SQL statements based on associated indexes and/or access paths. Techniques for clustering query statements are discussed further below in Section 6, titled *Clustering and Analyzing Related Query Statements.*

At operation 210, process 200 identifies unchanged database queries with regressed performance, if any, based on a comparison of execution metrics between execution of the same query in the most recent and previous timeframes. For example, process 200 may determine whether CPU time, CPU instruction executions, buffer gets, elapsed time, and/or I/O operations have increased between executions. In some embodiments, process 200 may detect a regression if one or more of the execution metrics has increased more than a threshold amount. Minor fluctuations may be expected over an application lifecycle and may not benefit from additional analysis. However, statistically significant fluctuations may be precursors to more systemic issues. Therefore, catching these fluctuations early may help prevent significant service degradation or outages.

At operation 212, process 200 compares query execution plans for regressed database queries to determine if a change caused the degradation. For example, process 200 may parse the query execution plans to determine whether any operators have changed and/or whether the sequence of the operators within the plans have changed. If a change is detected, then process 200 may mark the portions of the plan that are different and present the annotated query plan to a user. If the plan has not changed, then process 200 may determine whether any other causes of degradation may be inferred. For example, process 200 may infer that a data size has significantly increased if the buffer gets and I/O execution metrics have also increased significantly. If CPU and elapsed time have increased but buffer gets and I/O execution metrics have not, then process 200 may infer other causes, which may be external to the query execution itself.

At operation 214, process 200 generates a report interface and/or tuning advice based on the cause of regressed performance, if any, in the captured workload.

In some embodiments, the report interface identifies the performance impact of different classes of queries, including unchanged queries and new queries, on the workload. For example, the report may compare the total aggregate execution metrics associated with each different class of queries. The report may further compare the execution metrics of missing queries with new queries and indicate how the change has affected overall performance. The user may drill down to view the highest impact individual queries associated with each class. Example user interfaces are described further below in Section 8, titled *Example Report and Alert Interfaces.*

4. Baselines and Seasonality

Workload analyzer 116 may run the collection and analysis process on-demand, at scheduled times/intervals, or on a continuous basis. Performance baselines used for workload comparisons may be fixed or rolling. A fixed performance baseline may be chosen by an administrator or set based on a particular timeframe when performance satisfied a threshold. Thus, a fixed baseline may serve as a reference workload when an application performed well.

A rolling baseline may change over time to reflect evolving conditions. For example, workloads may be compared with the collection immediately prior to the workload that is the target of an analysis. The rolling baseline may account for seasons where the reference baseline shifts from one season to the next (e.g., the workload captured from a previous instance of a season).

In other embodiments, a fixed or rolling artificial workload may be constructed based on two or more previous workloads. For example, the workload may include a union of database queries and average collection metrics for two or more prior workloads. As another example, a rolling baseline may be computed as a moving average of workloads from two or more previous time periods, such as two or more previous seasonal intervals.

In some embodiments, different baselines may be used for different seasons. For example, increased query volumes may be anticipated on Cyber Monday, and a fixed or rolling baseline may capture reference workload from this day. A different baseline may collect workload data on weekdays from 8 a.m. to 5 p.m. On a subsequent Cyber Monday event, workload analyzer 116 may select the corresponding seasonal baseline as a basis for performance comparisons rather than the weekday baseline to reflect different performance expectations. The seasonal intervals and baselines may vary from implementation to implementation. Such timeframe parameters may be exposed to and configurable by an end user.

Fixed and rolling baselines may be helpful for different use cases as indicated in the table below.

| Use Case | Rolling Baseline | Fixed Baseline |
|---|---|---|
| Are there any queries with new execution plans? | A direct indication of changes caused by changed execution plan. | Execution plans may evolve over time. Changes can be small but increased data volumes may cause new execution plan to be suboptimal. |
| Are there any queries with the same execution plan that have regressed? | Small variations may occur, and it may be difficult to draw a conclusion. | Changes caused by data volumes or higher payload may be found, especially when comparing over longer timespan. |
| Are there any new SQL statements compared to the baseline? | If the change is significant, SQL may be tuned or, if appropriate, removed. | Application evolves and minor changes daily may be seen as normal. |
| Are there any missing SQL statements from the baseline? | Reporting and other time-consuming operations may change over time. Fast detection and tune or restrict helps optimize performance. | But longer-term (e.g., monthly) comparisons may show a different picture. |

In some embodiments, workload analyzer 116 may allow administrators or other users to toggle between a rolling or fixed baseline based on the use cases indicated above. Additionally or alternatively, administrators may toggle between seasonal and non-seasonal baselines. In the former scenario, the administrator may specify one or more types of seasons to capture a baseline. A type of season may be defined in terms of a recurring seasonal interval and a window of time within the interval to capture the baseline. For example, if a system runs a batch process every Saturday, then an administrator may define a weekly season to recur on Saturdays from 12 a.m. to 11:59 p.m. to capture one type of workload. The administrator may further specify a weekly season that captures queries executed every weekday from 8 a.m. to 7 p.m. to capture a second type of workload occurring during typical business hours.

In some embodiments, workload analyzer 116 may automatically select or construct a baseline to use for performance analysis. For example, workload analyzer 116 may search for workload patterns based on the queries that are executed over time. Based on the analysis, workload analyzer 116 may identify patterns of queries that recur even though workloads may evolve or otherwise slightly differ over time. Workload analyzer 116 may determine the intervals at which patterns recur, whether the patterns exhibit seasonality, and prototypical performance metrics for the workloads. Workload analyzer 116 may set the parameters for the baseline based on the patterns. For example, workload analyzer 116 may select the timespan for a reference workload and, if seasonality is detected, the seasonal interval.

Additionally or alternatively, workload analyzer 116 may select whether to use a fixed or rolling baseline based on a detected or predicted use case. If a fixed baseline is used, then workload analyzer 116 may select the window of time to use for the reference workload based on how well various candidate timeframes represents a prototypical workload and/or the performance profile of the workload executed within candidate timeframes. For example, workload analyzer 116 may search for a window that captures the most frequently recurring query executions that has the best performance score, where the performance score may be computed as a function of one or more of the performance metrics described above.

In other embodiments, a baseline may be constructed as an aggregation of two or more workloads. To construct the baseline, workload analyzer 116 may extract queries that are commonly executed on a recurring basis and exclude queries that recur less than a threshold number of times. For instance, queries executed only one time may be filtered out, although the threshold may vary depending on the particular implementation. Workload analyzer 116 may average the performance metrics for the retained queries to construct a prototypical workload profile. If seasonal patterns are detected, then workload analyzer 116 may construct multiple workload profiles for different types of seasons.

5. Tuning Advice and Testing

Workload analyzer 116 may determine what tuning advice to recommend and implement based on the performance impact associated with changes in the distribution of queries and changes in performance of individual queries between different captured workloads. For example, workload analyzer 116 may compare aggregate execution metrics for unchanged queries in the most recent workload and a previous workload. If performance for one or more metrics has regressed more than a threshold, then workload analyzer 116 may compare the performance of unchanged queries between the different timeframes to identify which unchanged queries have regressed and the degree to which the queries of regressed.

For individual queries that have regressed, workload analyzer 116 may continue to drill-down and compare execution plans, as previously noted. Workload analyzer 116 may then determine what tuning advice to provide/implement, if any, based on the comparison. For example, if a change in the execution plan to an unchanged query is determined to be causing regression, then workload analyzer 116 may recommend rolling back to a previously accepted query execution plan or may implement the rollback automatically. If another cause is detected, then process 200 may recommend or implement other changes, such as reducing the size of a table (or other database object) or generating/updating an index within the database.

Additionally or alternatively, workload analyzer 116 may compare execution metrics of new queries in the most recent workload with execution metrics of missing queries captured from the previous workload. If the execution metrics for the new queries are significantly worse (e.g., increased CPU time, elapsed time, buffer gets, etc.) compared to the missing queries, then workload analyzer 116 may recommend tuning the associated query set. Workload analyzer 116 may further detect the new queries that have the highest performance impact. These queries may be presented to an administrator and analyzed to determine if the queries are expected. Workload analyzer 116 may block future executions of the SQL ID if warranted. In other embodiments, workload analyzer 116 may provide hints to query optimizer 112 that direct the query optimizer 112 to choose a different query execution plan or otherwise modify the existing query execution plan for a new query that is causing performance fluctuations.

Figure 3:
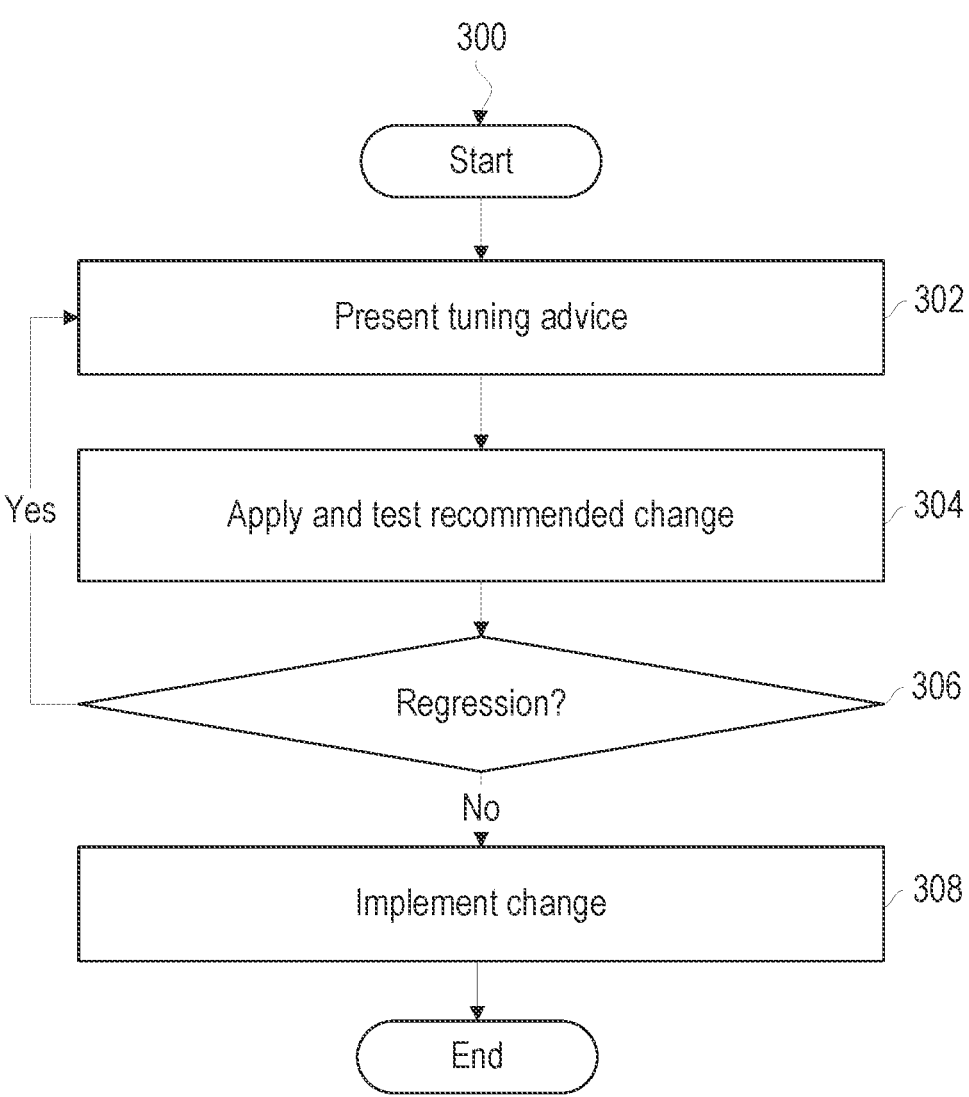
FIG. 3 illustrates an example set of operations for tuning database queries based on workload analytics and resulting feedback in accordance with some embodiments.

FIG. 3 illustrates an example set of operations for tuning database queries based on workload analytics and resulting feedback in accordance with some embodiments. One or more operations illustrated in FIG. 3 may be modified, rearranged, or omitted all together. Accordingly, the particular sequence of operations illustrated in FIG. 3 should not be construed as limiting the scope of one or more embodiments.

At operation 302, process 300 presents tuning advice to a user. For example, process 300 may recommend a change to a query execution plan, use of an index, reducing the size of a table, and/or some other change predicted to optimize performance.

At operation 304, process 300 applies and tests a recommended change within a test or production environment. For example, process 300 may modify a query execution plan and run the query to determine whether performance improved. After execution is complete the query execution may be rolled back to a previous state. As another example, one or more queries from the captured workload may be run against a new table or using a new index to determine whether execution metrics improved.

At operation 306, process 300 determines whether performance has regressed based on the test. If so, then the process returns to operation 302, and tuning may continue until the advice is exhausted or performance improvements have been achieved.

If performance has not regressed, then at operation 308, process 300 implements the change. Workload analyzer 116 may continue to monitor the impact of the change on future workloads and continue fine-tuning as appropriate.

In the above process, workload analyzer 116 may iteratively tune various parameters associated with a workload based on the detected differences in the distributions of a target workload and a baseline workload and differences between performance metrics of individual queries. By comparing workloads in a wholistic manner, workload analyzer 116 may isolate the root cause of performance degradation and optimize tuning operations accordingly. For example, workload analyzer 116 may determine whether new queries are having the greatest performance impact on the workload or if exiting queries have seen a significant performance drop. In the former scenario, workload analyzer 116 may focus tuning operations on the newly added queries, such as by performing/recommending query rewrites, creating new indexes, modifying query execution plans, and/or otherwise adjusting the parameters associated with executing the new queries. In the latter case, workload analyzer 116 may parse the query execution plans to determine whether any operators have changed and/or whether the sequence of the operators within the plans have changed. If a change is detected, then workload analyzer 116 may rollback to a previous plan when the query is performant. If the plan has not changed, then workload analyzer 116 may determine whether any other causes of degradation may be inferred. In some cases, workload analyzer 116 may infer that a data size has significantly increased if the buffer gets and I/O execution metrics have also increased significantly. Workload analyzer 116 may tune the query accordingly, such as by creating indexes, modifying the underlying database structures, or modifying the query execution plan. Other tuning operations may also be executed depending on the detected root cause.

In some embodiments, workload analyzer 116 may use machine learning ML techniques to optimize the tuning advice that is recommended or automatically implemented. For example, workload analyzer 116 may include an artificial intelligence (AI) engine that trains a model to learn tuning optimization to recommend or implement without being explicitly programmed to do so with specific rules or instructions. The ML model may monitor the results of various tuning optimizations that are deployed, and use the results to fine-tune the ML model. As new workloads that the ML model has not been trained on are received, the AI engine may apply the ML model to generate predictions or decisions on which tuning advice to recommend and/or implement. Example machine learning applications are described in further detail in Section 9, titled *Machine Learning Applications.*

6. Clustering and Analyzing Related Query Statements

In some embodiments, workload analyzer 116 performs a cluster-based analysis on query statements to isolate the root cause of sub-optimal performance of a workload. Workload analyzer 116 may cluster SQL statements and/or database queries that are different (e.g., queries or statements that do not share the same SQL ID) if the performance impact is predicted to be related in some way. Workload analyzer 116 may generate the reports, recommendations, and/or tuning advice based on the cluster-based root cause analysis.

In some embodiments, workload analyzer 116 clusters queries or query statements based on access methods. An access method or path in this context refers to a logical representation of the path or route used to access a specific set of data in a database. For example, a sequential access path is a method of accessing data where the system reads data sequentially from start to end, which is generally slow and used when data is stored on tape. An indexed access path uses an index to locate data in the database, where an index may be created based on one or more columns in a database table, allowing for faster data retrieval than a sequential access. Other access methods include using a hash function to locate data in the database and providing a direct access path that uses a unique identifier to access a specific record in a database. Changes in access paths, such as an index removal, may have effects on several different statements in a database.

As previously noted, workload analyzer 116 may detect statements with plan changes and pinpoint the root cause. The root cause analysis may include clustering statements that have changes with a common reason, which may facilitate isolating and fixing problems impacting a workload. When one change affects several statements, workload analyzer 116 may use cluster analysis to identify the common root.

In some embodiments, workload analyzer 116 detects when there is a changed access path, such as an index removal or change in access method for the index (e.g., a merge join changed to a hash join). If a changed access path is detected, then workload analyzer 116 identifies and groups statements impacted by the change. The result is a cluster of statements affected by the change or, stated another way, the same root cause.

As an example, workload analyzer 116 may generate the following clusters:

Cluster (Index A)
    Change: Index A removed/missing
    Affected SQLs
        SQL ID: abc. SQL Text: Select a from . . .
        SQL ID: cde. SQL Text: Select a,b from . . .
Cluster (Index B)
    Change: Access method changed from merge join to hash join
    Affected SQLs
        SQL ID: mno. SQL Text: Select a,b,c from . . .
        SQL ID: pqr. SQL Text: Update order set . . .

In the present example, each cluster identifies the change, the SQL IDs, and the SQL text for the statements that have been assigned to the cluster.

In some embodiments, a workload analysis report may be generated based on the clusters. For example, the report may allow a user to drill down on individual statements. In response to selecting a particular statement, the report interface may highlight the section where the change has occurred. In some cases, a statement may appear in multiple changes/clusters. In these cases, the report may highlight the most dominant change, where dominant in this context refers to the change having the greatest impact on the performance of the workload, as determined based on the collected performance metrics.

Additionally or alternatively, workload analyzer 116 may generate recommendations and/or tune the database based on the set of clusters. For example, workload analyzer 116 may regenerate a removed index or revert to a merge join from a hash join if the performance has been negatively impacted for the SQLs assigned to the cluster. Other changes in the access path may also be recommended or applied based on the set of clusters and associated performance impact.

In some embodiments, the clustering algorithm accounts for changes in estimated rows, which may cause a query to change execution plans or to keep a less optimal execution plan. Query statements associated with such changes may be clustered separately. By analyzing whether an index exists and if there have been any changes in optimizer statistics, workload analyzer 116 may provide a root cause analysis of the changes.

7. Correlation With Automatic Workload Repository Metrics

In some cases, query performance may regress without an obvious reason. For instance, although a query retrieves the same or similar number of rows and the execution plan is the same, the elapsed time to execute the query may have increased while other metrics, such as CPU or buffer gets are the same or similar. In these cases, workload analyzer 116 may perform a correlation analysis with performance data from an automatic workload repository (AWR) to identify the root cause of the problem.

An AWR is a built-in performance diagnostic tool in some database systems that provides detailed information about database performance and workload. The AWR collects and stores performance statistics such as CPU usage, memory usage, I/O throughput, and response time data at regular intervals. AWR reports may further identify top SQL statements by resource consumption, wait events, and active sessions.

In some embodiments, the correlation analysis includes reading the performance statistics collected by the AWR and determining whether a change in these metrics is correlated with the regression in performance of the query. For example, workload analyzer 116 may determine, based on the AWR reports, whether there was an increased wait time in the database system at or around the time the query was executed relative to the reference timeframe. If an increased wait time is detected, then workload analyzer 116 may determine if it was caused by CPU throttling by a resource manager. A resource manager may throttle the CPU for a variety of reasons, such as to conserve energy, prevent system overloading, and/or reduce heat generated by the CPU. Additionally or alternatively, workload analyzer 116 may determine whether the wait times is correlated with a greater amount of user activity, which may be determined based on the number of active sessions and queries submitted to the database system.

A correlation analysis on a set of metrics, such as concurrency, wait, CPU, I/O, and resource management throttling, may help isolate the root cause of the regression in the performance of a query. Workload analyzer 116 may include the information in the report and/or use the information to generate/implement tuning advice.

8. Example Report and Alert Interfaces

Figure 4A:
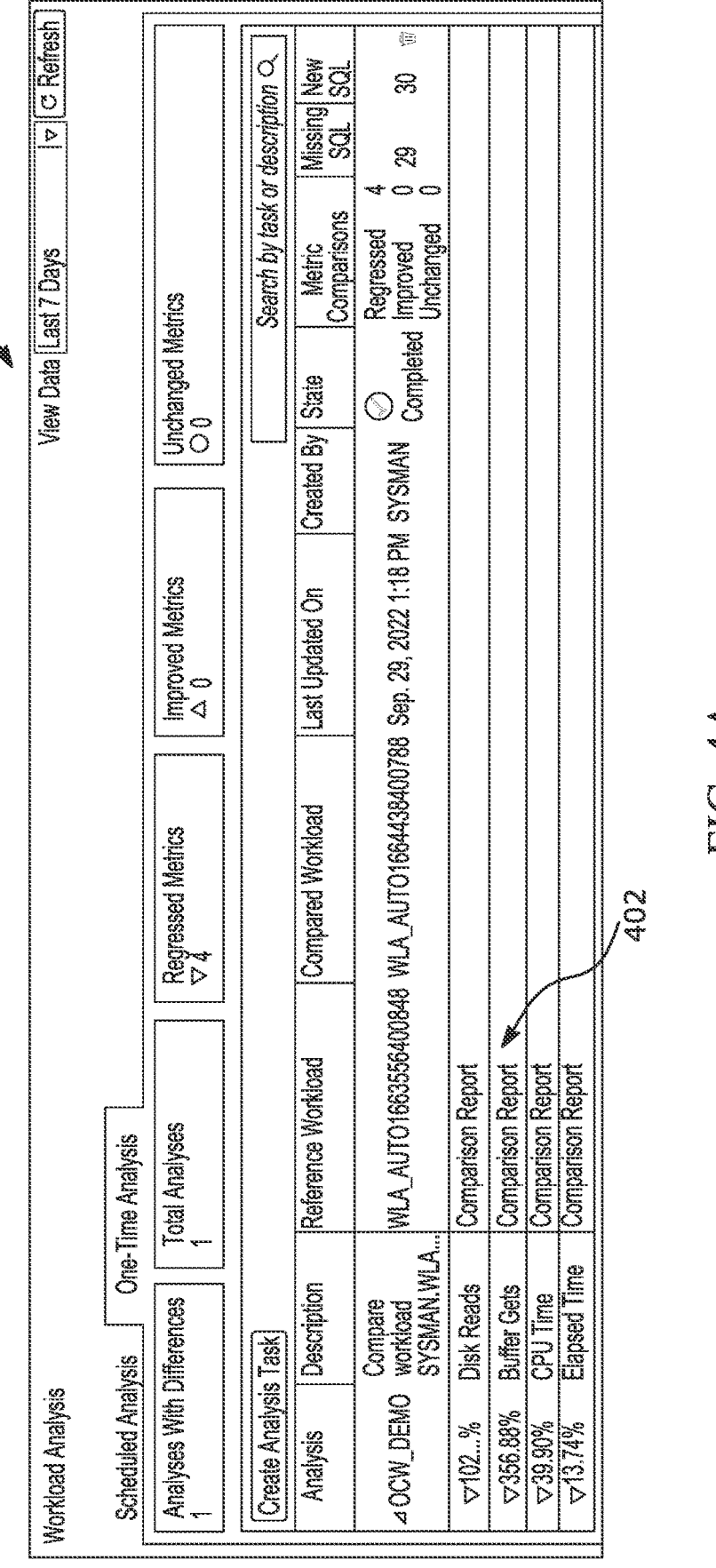
FIG. 4A illustrates an example workload analysis report interface in accordance with some embodiments.

FIG. 4A illustrates workload analysis report interface 400 in accordance with some embodiments. Report interface 400 presents the results of a one-time analysis that compares a target workload with a reference workload. The results include a comparison of the aggregate workload metrics, identifying how many of these metrics regressed, how many improved, and how many changed. In the present example, four of the aggregate workload metrics regressed from the baseline including disk reads, buffer gets, CPU time, and elapsed time. The user may select the comparison report hyperlinks 402 to drill-down into the cause of the regression for each of these metrics.

Figure 4B:
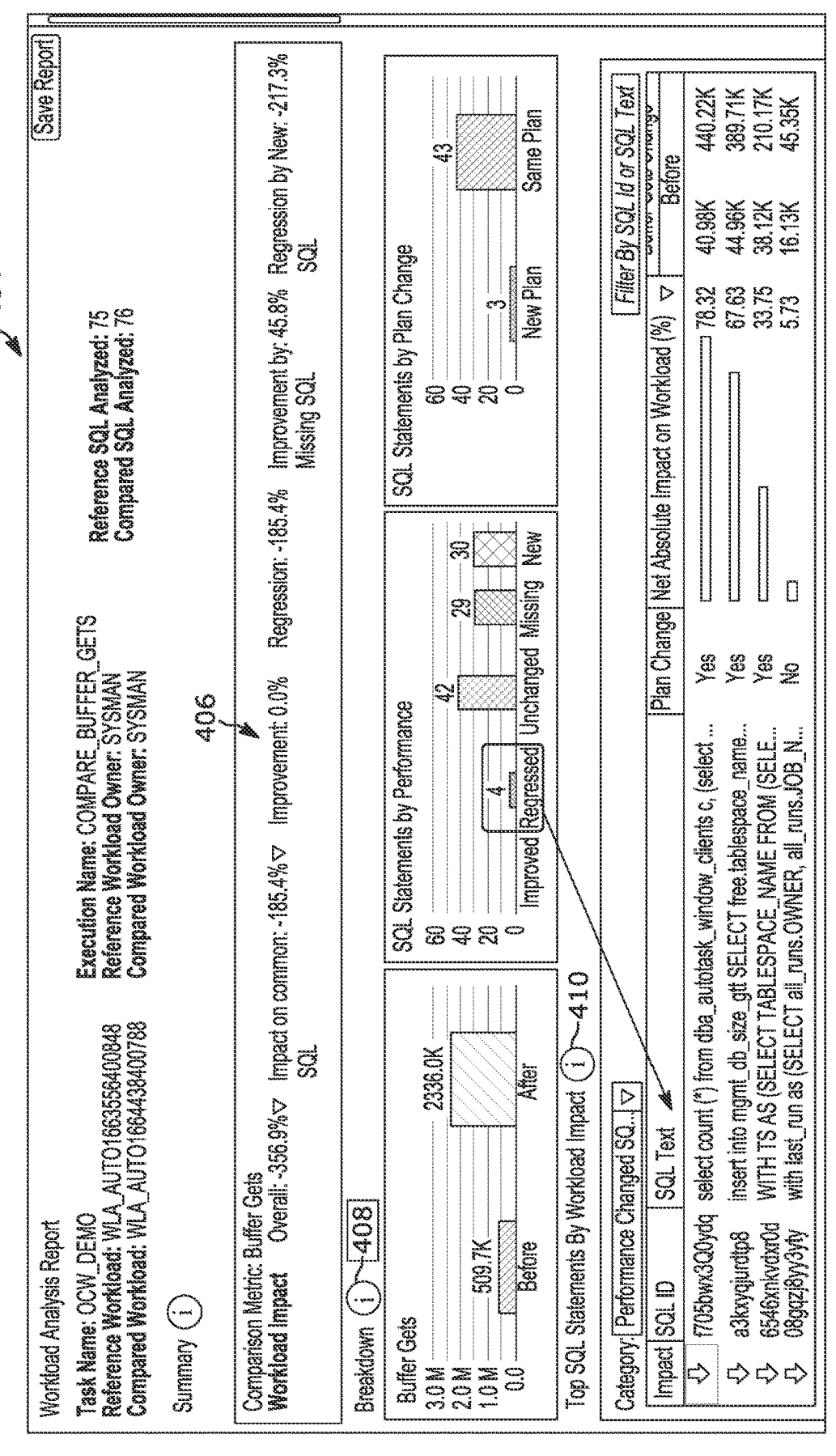
FIG. 4B illustrates another example workload analysis report interface in accordance with some embodiments.

FIG. 4B illustrates workload analysis report interface 404 in accordance with some embodiments. Report interface 404 presents a detailed comparison of buffer gets between the target workload and the reference workload. The comparison includes impact report 406, which presents the overall workload impact of the buffer gests, the performance impact on common SQLs, the performance improvement or regression relative to the baseline, the improvement in buffer-get performance from not having to execute missing SQLs that were present in the reference baseline workload, and the regression in buffer-get performance from executing the new SQLs that were not present in the baseline workload.

The comparison further includes breakdown report 408 that shows the total buffer gets in the baseline workload and the target workload.

Breakdown report 408 also includes a histogram depicting SQL statement classes by performance. The histogram bins represent: (a) unchanged SQLs with improved performance; (b) unchanged SQLs with regressed performance; (c) unchanged SQLs with no change in performance, (d) missing SQLs that were present in the reference workload but not the target workload; and (e) new SQLs in the target workload that were not present in the reference workload. The size of the bin represents the contribution of each class of SQLs to the total buffer in the reference and/or target workload.

The report further depicts SQL statements by plan change for the unchanged SQLs. The histogram includes a first bin rendered based on how many SQLs have new plans and a second bin rendered based on how many plans are unchanged. In the present example, two out of the four regressed SQL statements had plan changes.

Report interface 404 further presents the top regressed SQL statements by performance impact 410. The list of SQLs is sorted with the highest impact SQL and descending in order of impact. The impact may be determined by computing the difference between the buffer gets in the target workload and the previous workload when executing the SQL statement, with the impact increasing the larger the magnitude of the difference.

Figure 4C:
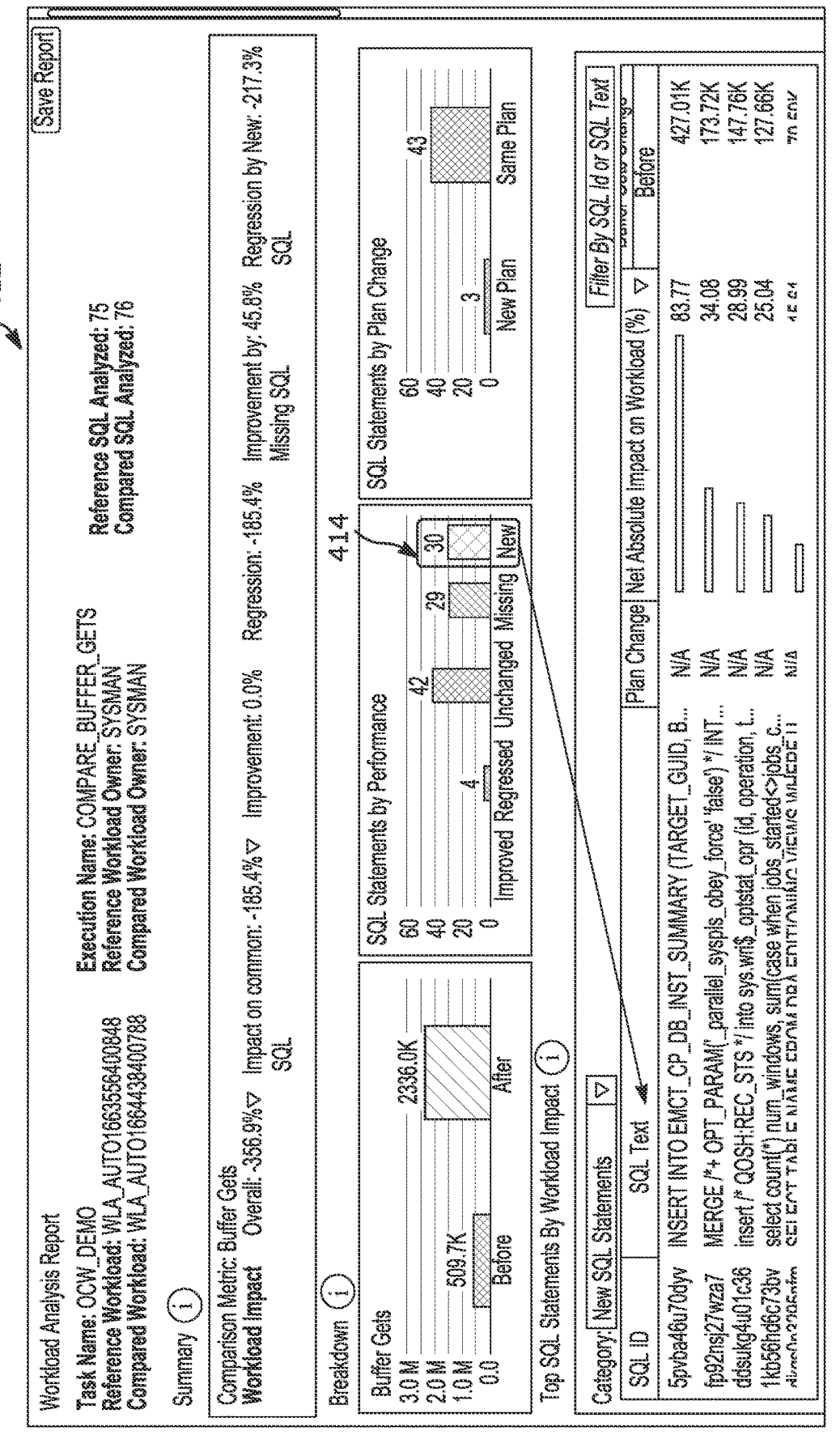
FIG. 4C illustrates another example workload analysis report interface in accordance with some embodiments.

FIG. 4C illustrates workload analysis report interface 412 in accordance with some embodiments. Report interface 412 may be presented responsive to the user selecting the New histogram bin 414. In response, the list of queries is updated to present new SQLs with the highest impact. For new SQL executions, there is no previous execution to compare in the reference workload. Therefore, the list may be sorted based on total buffer gets incurred in the most recent execution without computing a difference.

Figure 4D:
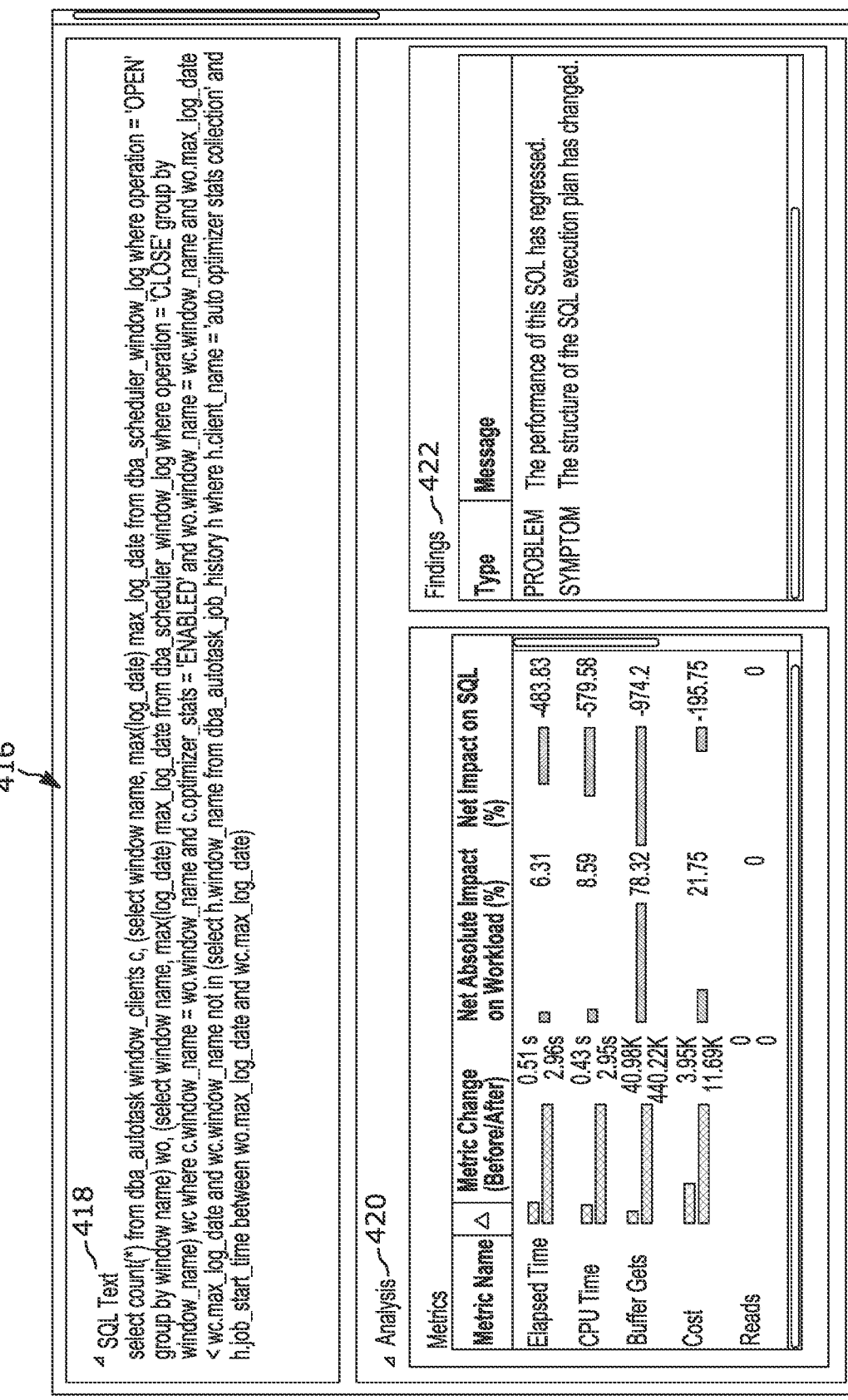
FIG. 4D illustrates an example query performance report interface for a database query in a workload in accordance with some embodiments.

FIG. 4D illustrates query performance report interface 416 for a database query in a workload in accordance with some embodiments. Report interface 416 presents the text of a SQL statement 418, a performance analysis 420, and a set of findings/insights 422. The performance analysis 420 presents differences in execution metrics, the net absolute impact (as a percentage) on the workload, and the net impact on the query execution. Workload analyzer 116 generates findings/insights 422 based on the performance analysis, which indicates that the performance of the SQL has regressed, and the structure of the SQL execution plan has changed.

Figure 4E:
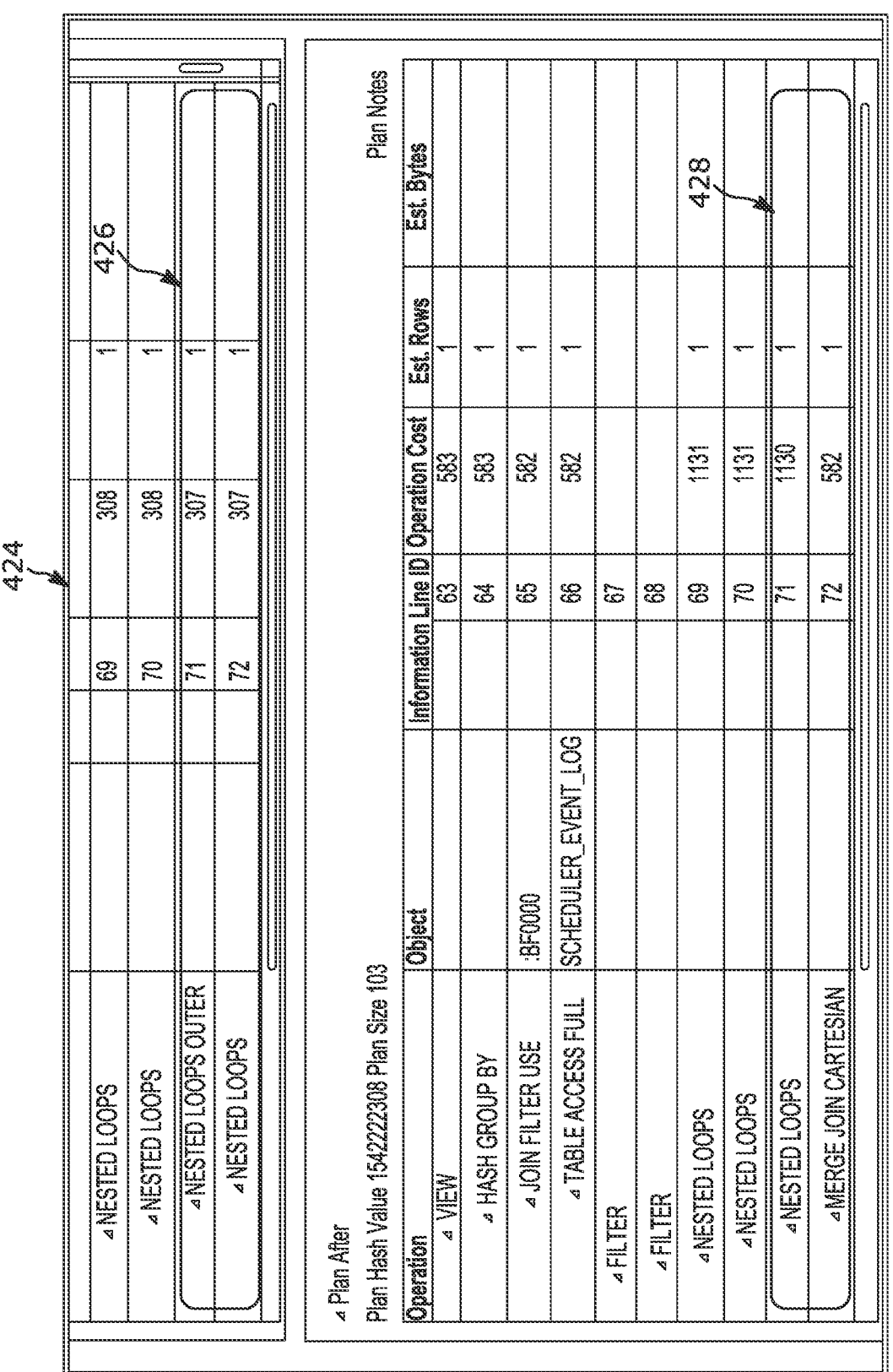
FIG. 4E illustrates an example query plan comparison interface for a database query in a workload in accordance with some embodiments.

FIG. 4E illustrates query plan comparison interface 424 for a database query in a workload in accordance with some embodiments. Comparison interface 424 highlights the differences in the query execution plan from the prior workload and the most recent workload. In the present example, the NESTED LOOPS operators 426 and MERGE JOIN CARTESIAN operators 428 are different from operators in the prior plan. Comparison interface 424 highlights these differences to isolate a potential contributing cause of degradation in a workload. The interface may further allow the user to rollback to the previous execution plan to address the regression.

9. Machine Learning Applications

In some embodiments, workload analyzer 116 includes an AI engine that trains and applies ML models to generate predictions directed to optimizing workload performance. Such models may be trained using machine learning algorithms that can be iterated to learn a target model f, where the model maps a set of input variables to an output variable using a set of training data. Various types of algorithms may be used, such as linear regression, logistic regression, linear discriminant analysis, classification and regression trees, naïve Bayes, k-nearest neighbors, learning vector quantization, support vector machines, bagging and random forest walkthroughs, boosting, backpropagation, and/or clustering. The model output may include an estimated label representing a prediction that a particular action (e.g., rolling back a query execution plan, performing a particular modification to the query execution plan, using an index, reducing a table size, etc.) would improve the execution metrics associated with a workflow. Workload analyzer 116 may provide tuning recommendations and/or implement workload changes based on the model output.

Additionally or alternatively, ML models may be trained and applied for other workload analysis applications. In some embodiments, workload analyzer 116 may train an ML model to detect and infer workload patterns. For example, an ML model may be applied to detect seasonal patterns based on similarities between workload characteristics for different workloads executed at a seasonal interval. The seasonal patterns may be used to select or construct baselines, as previously described, and/or to perform other seasonal-aware operations including anomaly detections.

In some embodiments, an anomaly detection model may be trained to detect anomalies based on patterns of performance fluctuations between different workloads. The ML model may predict whether a performance fluctuation is anomalous or not based on the learned patterns. If anomalous behavior is detected, then the ML model output may trigger alerts and/or other automated responsive actions to address the problematic behavior.

In some embodiments, the ML model that is trained includes one or more neural networks. Training and fine-tuning a neural network may use data collected from the database tuning process previously described. For example, a training process may form feature vectors for a training example based on (a) the difference in distribution between the target workload and the baseline workload; (b) the differences in performance metrics of individual queries; (c) the differences in query execution plans of common queries; and (d) the tuning optimizations applied automatically or by an administrator. A label for a training example may be generated based on one or more changes in performance metrics from the applied tuning optimizations. A binary label may indicate whether the optimizations were successful or not. A multiclass label may identify the degree of the impact, such as using a performance score.

The AI engine may use the training example to train or fine-tune the neural network. For example, the training process may include performing the following steps:

Forward propagation: In this step, the training examples (or a segment of training examples) is fed into the neural network, and the outputs are calculated layer by layer, using the current weights of the network.

Error calculation: The difference between the predicted output and the actual output is calculated using a loss function such as mean squared error (MSE) and cross-entropy loss.

Backward propagation: In this step, the error is propagated backwards through the network, and the gradients of the loss function with respect to the weights of the network are calculated.

Weight update: The weights of the network are updated using an optimization algorithm, such as stochastic gradient descent (SGD), that takes into account the gradients calculated in the previous step.

A tuning process may update various hyperparameters such as the learning rate, which determines the size of the weight update, the number of layers in the neural network, and the regularization strength. The steps may be repeated for a threshold number of training epochs or until the network converges by a threshold amount. During a training epoch, the entire set of training examples may be passed through the network.

Once the neural network is trained, it may be applied to new examples on which the neural network was not trained. For example, when a new workload is received, the process may compute a set of feature vectors may be generated based on (a) the difference in distribution between the new workload and the baseline workload; (b) the differences in performance metrics of individual queries between the workloads; (c) the differences in query execution plans of common queries; and (d) a candidate tuning optimization. Various feature vectors may be formed for different possible tuning optimizations and fed through the neural network. With a binary classifier, the neural network may predict whether the tuning optimization will be successful or not. In other cases, the neural network may predict a performance score or other measure of a performance impact associated with the tuning optimization. If the output satisfies a threshold (e.g., the optimization is predicted to be successful, the performance score is above a threshold), then the system may recommend or automatically apply the optimization.

10. Computer Networks and Cloud Networks

In some embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In some embodiments, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In some embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In some embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In some embodiments, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In some embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In some embodiments, in a multi-tenant computer network, tenant isolation is implemented to ensure that the applications and/or data of different tenants are not shared with each other. Various tenant isolation approaches may be used.

In some embodiments, each tenant is associated with a tenant ID. Each network resource of the multi-tenant computer network is tagged with a tenant ID. A tenant is permitted access to a particular network resource only if the tenant and the particular network resources are associated with a same tenant ID.

In some embodiments, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In some embodiments, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In some embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

11. Microservice Applications

According to some embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using Hypertext Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In some embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to some embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In some embodiments, a plugged-in microservice application may expose actions to the microservices manager. The exposed actions may receive, as input, data or an identification of a data object or location of data, that causes data to be moved into a data cloud.

In some embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In some embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

12. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
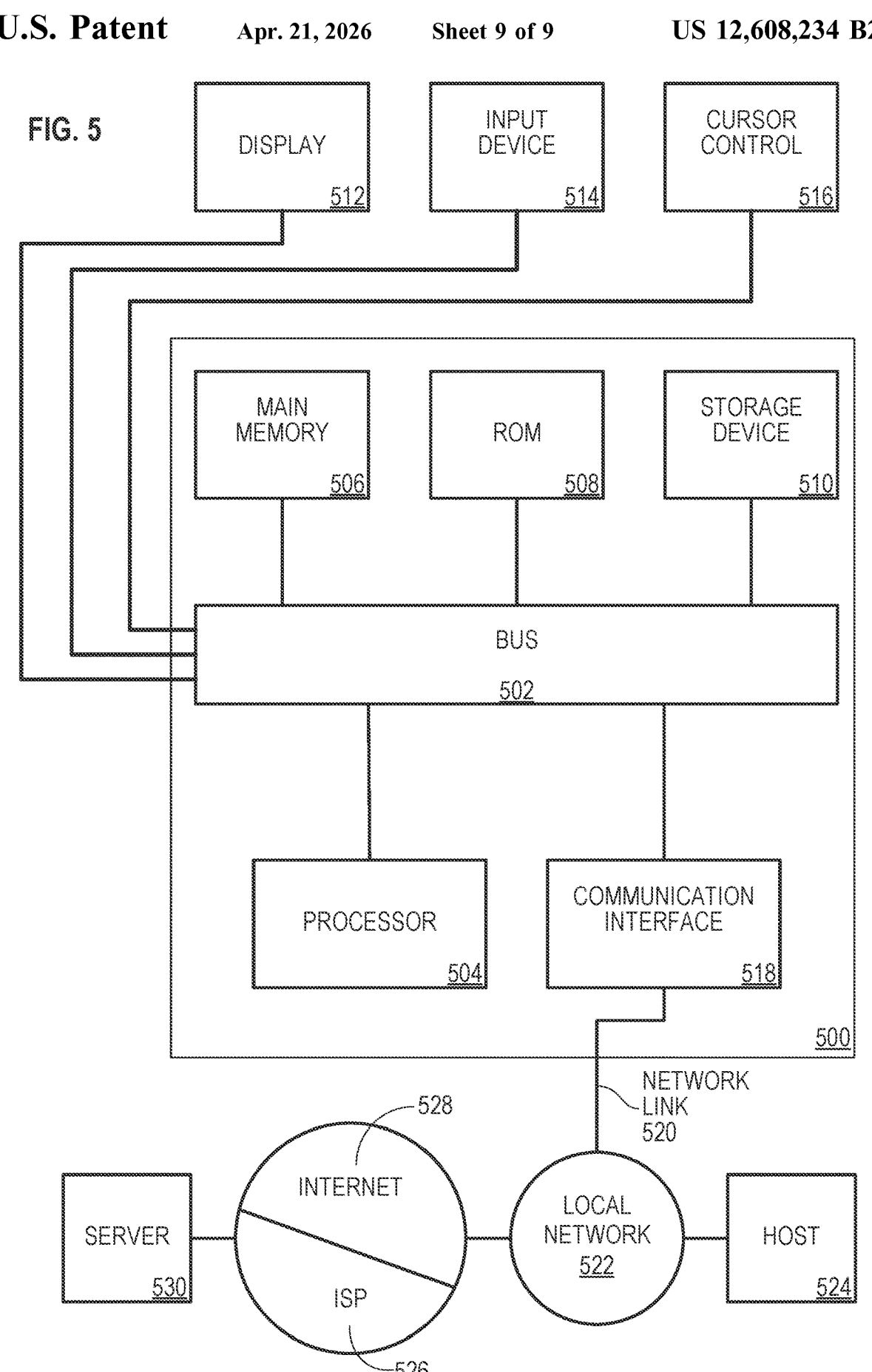
FIG. 5 shows a block diagram that illustrates a computer system in accordance with one or more embodiments.

For example, FIG. 5 is a block diagram that illustrates computer system 500 upon which some embodiments of the invention may be implemented. Computer system 500 includes bus 502 and/or one or more other communication mechanisms for transferring data between system components. Computer system 500 also includes hardware processor 504 coupled with bus 502 for processing information. Hardware processor 504 may be, for example, a general-purpose microprocessor.

Computer system 500 further includes main memory 506, such as random-access memory (RAM) and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 and/or other static storage device coupled to bus 502 for storing static information and instructions for processor 504. Storage device 510, such as a magnetic disk or optical disk, is provided and coupled to bus 502 for storing information and instructions.

Computer system 500 may be coupled via bus 502 to display 512, such as a cathode ray tube (CRT) or light-emitting diode (LED) screen, for displaying information to a computer user. Input device 514, including alphanumeric and other keys, is coupled to bus 502 for communicating information and command selections to processor 504. Another type of user input device is cursor control 516, such as a touchscreen, mouse, a trackball, or cursor direction keys for communicating direction information and command selections to processor 504 and for controlling cursor movement on display 512. This input device may have two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes communication interface 518 coupled to bus 502. Communication interface 518 provides a two-way data communication coupling to network link 520 that is connected to local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to host computer 524 or to data equipment operated by Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

13. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

identifying a first workload associated with a first timeframe, wherein the first workload includes a first set of database queries executed within the first timeframe;

performing a comparison of the first workload associated with the first timeframe and at least one other workload associated with a different timeframe, wherein the at least one other workload includes a second set of database queries executed within the different timeframe;

determining, based on the comparison of the first workload associated with the first timeframe and the at least one other workload associated with the different timeframe, differences between (a) an aggregate distribution between the first set of database queries and the second set of database queries and (b) performance metrics associated with at least one of individual database queries or query statements that are common to the first set of database queries and the second set of database queries;

generating, based on the differences, tuning advice to address a cause of degraded performance between the first workload and the at least one other workload;

tuning, by a query optimizer, at least one database query based on the tuning advice; and after tuning, executing the at least one database query.

2. The method of claim 1, wherein determining the differences between the aggregate distribution between the first set of database queries and the second set of database queries comprises: determining (a) which database queries are new in the first workload that are not present in the at least one other workload, (b) which database queries are unchanged between the first workload and the at least one other workload, and (c) which database queries are missing in the first workload and present in the at least one other workload.

3. The method of claim 2, further comprising: determining performance changes for different subsets of database queries based on the differences in the aggregate distribution including a first performance impact for the database queries that are new in the first workload that are not present in the at least one other workload and a second performance impact for database queries that are unchanged between the first workload and the at least one other workload; and generating a report that includes an indication of the first performance impact and the second performance impact.

4. The method of claim 1, wherein a particular database query is included in the first set of database queries and the second set of database queries, wherein determining the differences between the performance metrics associated with at least one of individual database queries or query statements that are common to the first set of database queries and the second set of database queries comprises: detecting a regression in performance between executing a particular database query in the first timeframe and the different timeframe; responsive to detecting the regression in performance between executing the particular database query in the first timeframe and the different timeframe, comparing a first execution plan for executing the particular database query in the first timeframe with a second execution plan for executing the particular database query in the second timeframe to identify changes between the first execution plan and the second execution plan; and responsive to identifying changes between the first execution plan and the second execution plan, adding an indication to a report of a performance impact of the changes on the first workload.

5. The method of claim 1, further comprising: identifying, based on the comparison of the first workload associated with the first timeframe and the at least one other workload associated with the different timeframe, a subset of database queries that have a greatest performance impact on the first workload; and generating a report including an indication that the subset of database queries have the greatest impact on the first workload.

6. The method of claim 1, further comprising: identifying, based on the comparison of the first workload associated with the first timeframe and the at least one other workload associated with the different timeframe, a subset of database queries that have a greatest performance impact on the first workload; and responsive to identifying the subset of database queries, wherein tuning the at least one database query of the subset of database queries includes performing at least one of: rolling back to a previously accepted execution plan for the at least one database query, modifying a current execution plan of the at least one database query, updating an index within a database, or reducing a size of a database object accessed by the at least one database query.

7. The method of claim 1, wherein performing the comparison comprises: comparing the first workload with at least one of a rolling performance baseline that is periodically updated based on workloads within a rolling window of time or a fixed performance baseline that is determined based on a particular timeframe when performance satisfied a threshold.

8. The method of claim 1, further comprising: detecting query statements associated with plan changes; clustering the query statements based at least in part on access methods associated with the query statements; and identifying a root cause of a performance regression of the first workload based at least in part on a subset of the query statements that are assigned to a particular cluster.

9. The method of claim 1, wherein the first timeframe and the different timeframe correspond to a particular window of time within a particular season; the method further comprising: seasonally monitoring workload performance by periodically comparing database queries within the particular window of time within a seasonal interval associated with the particular season.

10. The method of claim 1, further comprising: determining based on the comparison, that a performance of the first workload has regressed more than a threshold; responsive to determining that the performance of the first workload has regressed more than a threshold, generating an alert to notify a user of the performance regression of the first workload.

11. One or more non-transitory computer-readable media storing instructions which, when executed by one or more hardware processors, cause:

identifying a first workload associated with a first timeframe, wherein the first workload includes a first set of database queries executed within the first timeframe;

performing a comparison of the first workload associated with the first timeframe and at least one other workload associated with a different timeframe, wherein the at least one other workload includes a second set of database queries executed within the different timeframe;

determining, based on the comparison of the first workload associated with the first timeframe and the at least one other workload associated with the different timeframe, differences between (a) an aggregate distribution between the first set of database queries and the second set of database queries and (b) performance metrics associated with at least one of individual database queries or query statements that are common to the first set of database queries and the second set of database queries;

generating, based on the differences, tuning advice to address a cause of degraded performance between the first workload and the at least one other workload;

tuning, by a query optimizer, at least one database query based on the tuning advice; and after tuning, executing the at least one database query.

12. The media of claim 11, wherein determining the differences between the aggregate distribution between the first set of database queries and the second set of database queries comprises: determining (a) which database queries are new in the first workload that are not present in the at least one other workload, (b) which database queries are unchanged between the first workload and the at least one other workload, and (c) which database queries are missing in the first workload and present in the at least one other workload.

13. The media of claim 12, wherein the instructions further cause: determining performance changes for different subsets of database queries based on the differences in the aggregate distribution including a first performance impact for the database queries that are new in the first workload that are not present in the at least one other workload and a second performance impact for database queries that are unchanged between the first workload and the at least one other workload; and generating a report that includes an indication of the first performance impact and the second performance impact.

14. The media of claim 11, wherein a particular database query is included in the first set of database queries and the second set of database queries, wherein determining the differences between the performance metrics associated with at least one of individual database queries or query statements that are common to the first set of database queries and the second set of database queries comprises: detecting a regression in performance between executing a particular database query in the first timeframe and the different timeframe; responsive to detecting the regression in performance between executing the particular database query in the first timeframe and the different timeframe, comparing a first execution plan for executing the particular database query in the first timeframe with a second execution plan for executing the particular database query in the second timeframe to identify changes between the first execution plan and the second execution plan; and responsive to identifying changes between the first execution plan and the second execution plan, adding an indication to a report of a performance impact of the changes on the first workload.

15. The media of claim 11, wherein the instructions further cause: identifying, based on the comparison of the first workload associated with the first timeframe and the at least one other workload associated with the different timeframe, a subset of database queries that have a greatest performance impact on the first workload; and generating a report including an indication that the subset of database queries have the greatest impact on the first workload.

16. The media of claim 11, wherein the instructions further cause: identifying, based on the comparison of the first workload associated with the first timeframe and the at least one other workload associated with the different timeframe, a subset of database queries that have a greatest performance impact on the first workload; and responsive to identifying the subset of database queries, wherein tuning the at least one database query of the subset of database queries includes performing at least one of: rolling back to a previously accepted execution plan for the at least one database query, modifying a current execution plan of the at least one database query, updating an index within a database, or reducing a size of a database object accessed by the at least one database query.

17. The media of claim 11, wherein performing the comparison comprises: comparing the first workload with at least one of a rolling performance baseline that is periodically updated based on workloads within a rolling window of time or a fixed performance baseline that is determined based on a particular timeframe when performance satisfied a threshold.

18. The media of claim 11, wherein the instructions further cause: detecting query statements associated with plan changes; clustering the query statements based at least in part on access methods associated with the query statements; and identifying a root cause of a performance regression of the first workload based at least in part on a subset of the query statements that are assigned to a particular cluster.

19. The media of claim 11, wherein the first timeframe and the different timeframe correspond to a particular window of time within a particular season; wherein the instructions further cause: seasonally monitoring workload performance by periodically comparing database queries within the particular window of time within a seasonal interval associated with the particular season.

20. A system comprising:
one or more hardware processors;
one or more non-transitory computer-readable media storing instructions which, when executed by one or more hardware processors, cause:
identifying a first workload associated with a first timeframe, wherein the first workload includes a first set of database queries executed within the first timeframe;
performing a comparison of the first workload associated with the first timeframe and at least one other workload associated with a different timeframe, wherein the at least one other workload includes a second set of database queries executed within the different timeframe;
determining, based on the comparison of the first workload associated with the first timeframe and the at least one other workload associated with the different timeframe, differences between (a) an aggregate distribution between the first set of database queries and the second set of database queries and (b) performance metrics associated with at least one of individual database queries or query statements that are common to the first set of database queries and the second set of database queries;
generating, based on the differences, tuning advice to address a cause of degraded performance between the first workload and the at least one other workload;
tuning, by a query optimizer, at least one database query based on the tuning advice; and
after tuning, executing the at least one database query.

* * * * *